United States Patent [19]

Asakura

[11] Patent Number: 5,461,487
[45] Date of Patent: Oct. 24, 1995

[54] VIDEO PLAYBACK DEVICE CAPABLE OF REMOVING TIME BASE ERRORS FROM VIDEO SIGNALS

[75] Inventor: Hiroyuki Asakura, Kangawa, Japan

[73] Assignee: Sony Corporation, Tokyo, Japan

[21] Appl. No.: 112,972

[22] Filed: Aug. 30, 1993

[30] Foreign Application Priority Data

Aug. 31, 1992 [JP] Japan ..................... 4-231052

[51] Int. Cl.⁶ ............................. H04N 5/95; H04N 5/78
[52] U.S. Cl. .................... 358/339; 360/36.2; 360/37.1; 360/10.3; 348/497
[58] Field of Search .................... 358/319, 320, 358/321, 337, 338, 339, 312; 366/36.1, 36.2, 37.1, 10.1–10.3; 348/497, 498, 499, 526, 500, 521, 522, 523, 524; H04N 5/95, 9/79, 9/80, 9/89, 5/92

[56] References Cited

U.S. PATENT DOCUMENTS

| | | | |
|---|---|---|---|
| 4,063,284 | 12/1917 | Tatami | 360/38.1 |
| 4,437,125 | 3/1984 | Yamamoto | 358/327 |
| 4,733,312 | 3/1988 | Morimoto | 358/337 |
| 4,796,123 | 1/1989 | Takeuchi et al. | 358/339 |
| 5,191,434 | 3/1993 | Kim | 348/500 |
| 5,253,118 | 10/1993 | Konno | 360/36.1 |
| 5,280,396 | 1/1994 | Hamaguchi et al. | 360/36.1 |

*Primary Examiner*—Tommy P. Chin
*Assistant Examiner*—Thai Tran
*Attorney, Agent, or Firm*—William S. Frommer; Alvin Sinderbrand

[57] ABSTRACT

A time base correcting apparatus for removing time base errors from video signals in a video tape playback device which is operable in either a first normal or high speed operation mode or a second still motion or slow speed operation mode. In the first operation mode, first and second fields are reproduced in succession from successive tracks and in the second operation mode, the same field is reproduced at least twice in succession from the same track. The video signals are received and stored in a memory. First and second synchronizing signals corresponding to the first and second fields are alternately generated and include equalizing, vertical and horizontal sync pulses. Corrected first and second synchronizing signals are selectively generated during the second operation mode as a function of whether the second field or the first field is reproduced twice in succession. The first and second synchronizing signals are added to the first and second fields of video signals read out from the memory during the first operation mode; and during the second operation mode, when the first field is reproduced twice in succession, the first synchronizing signal and the corrected second synchronizing signal are added thereto, respectively, and when the second field is reproduced twice in succession, the second synchronizing signal and the corrected first synchronizing signal are added thereto.

3 Claims, 9 Drawing Sheets

VIDEO PLAYBACK DEVICE CAPABLE OF REMOVING TIME BASE ERRORS FROM VIDEO SIGNALS

FIELD OF INDUSTRIAL USE

The present invention generally relates to a time base correcting apparatus for correcting time base errors of a video signal caused by fluctuation in rotations of a rotary magnetic head and by variations in a tape drive operation with regard to, for instance, a reproduced video signal of a VTR (video tape recorder). More specifically, the present invention is directed to such a time base correcting apparatus for correcting temporal jitter and time base errors of a reproduced video signal when a video (image) signal of either a first field or a second field is repeatedly and continuously reproduced in either slow mode or still mode.

DESCRIPTION OF THE PRIOR ART

In conventional VTRs (video tape recorders), a time base correcting apparatus is provided such as is described in U.S. Pat. No. 4,063,284 and other publications as an apparatus for correcting time base errors of video signals reproduced by a rotary magnetic head from inclined tracks of a magnetic tape. Referring now to FIG. 1, one of these conventional time base correcting apparatuses will be described. A video (image) signal reproduced by the rotary head and the like from an inclined track of a magnetic tape contains temporal fluctuation (jitter). This reproduced video signal containing jitter is received as the input video signal. The input video signal is A/D-converted by an A/D (analog-to-digital) converting circuit 1, and then stored in a memory 2.

The video signal stored in the memory 2 is read out by a clock having a constant time period with no jitter. In other words, the jitter is absorbed via the memory 2. The read video signal is D/A-converted by a D/A (digital-to-analog) converter 3, and thereafter, the D/A-converted video signal is supplied to a synchronization signal adding circuit 4 in which a synchronization signal newly generated by a synchronization signal generating circuit 5 irrelevant to the synchronization signal of the input video signal is added to this D/A-converted video signal.

As represented in FIG. 2, as to the synchronization signal generated by the synchronization signal generating circuit 5, the vertical synchronization pulse of the second field is shifted by 0.5 H (symbol "H" denotes a horizontal scanning period) with respect to the vertical synchronization pulse of the first field. In this case, the number of equalizing pulses in the first field, prior to the vertical synchronization pulse, is selected as an even number, i.e., 6, whereas the number of equalizing pulses in the second field is selected as an odd number, i.e., 7, so that the first field is discriminated from the second field. As described above, the video signal to which the newly generated stable synchronization signal has been added is output and supplied thereafter to a video signal processing circuit (not shown) coupled to the above-described synchronization signal adding circuit 4.

As previously explained, in the synchronization signal added to the video signal read out from the memory 2 according to the conventional time base collector, the first field and the second field are alternately repeated. As a consequence, since the video signal in the first field and the video signal in the second field are alternately reproduced during normal or high-speed reproduction mode, both the synchronization signal in the first field and the synchronization signal in the second field are added to these video signals in the above-described manner, whereby a normal image can be reproduced.

On the other hand, slow-mode reproduction and still-mode reproduction are frequently performed in medical diagnostic VTRs and monitoring VTRs. In the case of slow-mode reproduction and the still-mode reproduction, since the same inclined track recorded on the magnetic tape is repeatedly scanned by the reproducing rotary head (not shown), a video signal of the same field is repeatedly reproduced. For instance, when the video signal in the first field is repeatedly reproduced in slow-mode reproduction, if the synchronization signal of the first field and the synchronization signal of the second field are alternately added to these repeatedly reproduced video signals, then the synchronization signal of the first field is added to a image appearing only in this first field, namely an image indicated by a circle a shown in FIG. 2a, which does not cause a problem. However, as represented in FIG. 2b, the synchronization signal of the second field is added to this image which is originally present in the first field, which causes the following problems.

That is, in this case, the image (indicated by a circle in FIG. 3a) which should be originally displayed only in the first field of the monitor 30, would be also displayed in the second field, as represented in FIG. 3b. This implies that an image which is not originally present is output. This is because a judgement is made in the monitor 30 as to whether the image is present in the first field, or in the second field based on the quantity of the equalizing pulse appearing before the vertical synchronization pulse.

In this case, an elongate ellipse can be seen, as indicated by the dotted line in FIG. 3b, although a circle should be originally seen. Such an adverse phenomenon may cause various problems. For example, when a medical diagnostic operation is carried out, or an object is observed, an image different from an originally recorded image would be displayed, which may lead to misjudgments.

OBJECT

An object of the present invention is to provide a time base correcting apparatus capable of correctly reproducing a image in a VTR even when either a video (image) signal of a first field, or a video (image) signal of a second field is repeatedly and continuously reproduced during variable speed reproduction such as slow-mode reproduction or still-mode reproduction.

SUMMARY OF THE INVENTION

To achieve the above-described object, a time base correcting apparatus for removing time base errors from video signals, according to one aspect of the present invention, comprises:

means for receiving video information;

means for detecting field information contained in said video information;

memory for storing both said video information and said field information;

means coupled to said receiving means, for generating a write clock pulse used to write said video information into said memory and for providing said write clock pulse to said memory;

means for generating a synchronizing signal to be synchronized with video signals stored in said memory;

means coupled to said synchronizing signal generating means, for generating a read clock pulse used to read from said memory correction video signals from which time base errors have been removed in response to said synchronizing signal and for providing said read clock pulse to said memory;

means coupled to said synchronizing signal generating means, for generating a correction synchronizing signal corresponding to said correcting video signals in response to said field information read from said memory; and means for adding said correcting synchronizing signal to said correction video signals.

Furthermore, a time base correcting apparatus for removing time base errors from video signals, according to another aspect of the present invention, comprises:

means for receiving analog video signals;

A/D converting means for converting said analog video signals to digital video signals;

means coupled to said receiving means, for detecting a quantity of equalizing pulses existing before vertical synchronizing pulses of said analog video signals to discriminate a first field from a second field of said analog video signals, and for outputting a field discriminating signal indicative of one of said first and second fields of analog video signals;

means for adding said field discriminating signal to said digital video signals to output added digital video signals;

first and second memories for storing said digital video signal;

first selecting means for alternately supplying said added digital video signals to one of said first memory and said second memory for every field in response to said field discriminating signal;

means coupled to said receiving means, for generating a clock signal synchronized with said analog video signals, which is used to write said added digital video signals into said first and second memories, and for supplying said generated clock signal to said first and second memories;

means for alternately producing a first synchronizing signal and a second synchronizing signal at a predetermined time period;

means coupled to said synchronizing signal generating means, for generating a clock signal synchronized with the synchronizing signal generated by said synchronizing signal generating means in order to read digital correction video signals from said first and second memories, from which time base errors have been removed, and for supplying said generated clock signal to said first and second memories;

a D/A converting circuit for converting said digital correction video signals derived from said first and second memory to analog correction video signals;

means for detecting changes in a field in response to said first and second synchronizing signals produced by said synchronizing signal generating means and for outputting a field change detecting signal indicative of said change in the field;

second selecting means for alternately providing said digital correction video signals read out from said first and second memories to said D/A converting circuit in response to said field change detecting signal;

means for converting said first and second field synchronizing signals produced by said synchronization signal generating circuit to synchronizing signals corresponding to the field of said analog correction signal;

said synchronizing signal converting means comprising;

first converting means for converting said first field synchronizing signal to a second field synchronizing signal;

second converting means for converting said second field synchronizing signal to a first field synchronizing signal;

means for detecting a first or second field from said digital correction video signals read from said first or second memory and for outputting a field detecting signal indicative of the first field or the second field; and third selecting means coupled to said synchronizing means and said first and second converting means, for selectively outputting respective output signals from said synchronizing signal generating means and said first and second converting means in response to said field detecting signal;

said time base correcting apparatus further comprising:

a synchronizing signal adding circuit for adding said synchronizing signals from said third selecting means to said analog correction video signals.

DETAILED DESCRIPTION OF THE PREFERRED EMBODIMENTS

Figure 1:
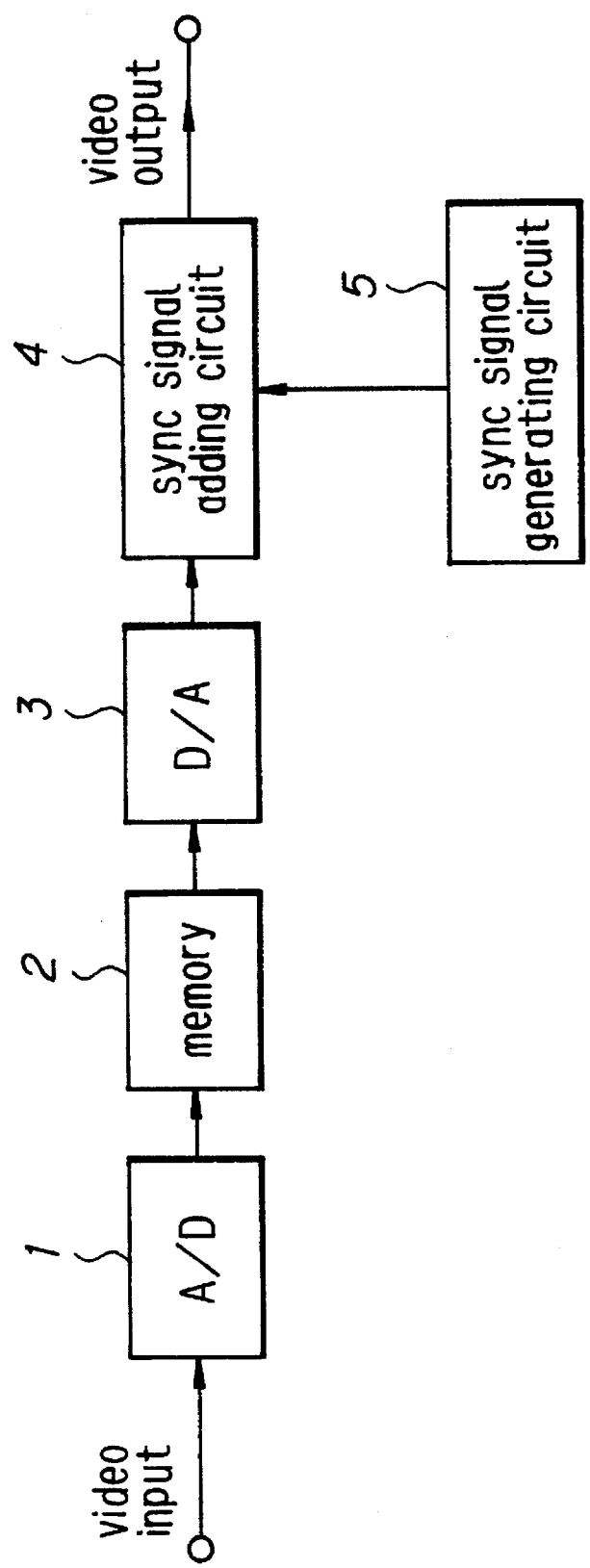
FIG. 1 is a schematic block diagram for explaining a conventional time base correcting apparatus.
Figure 2:
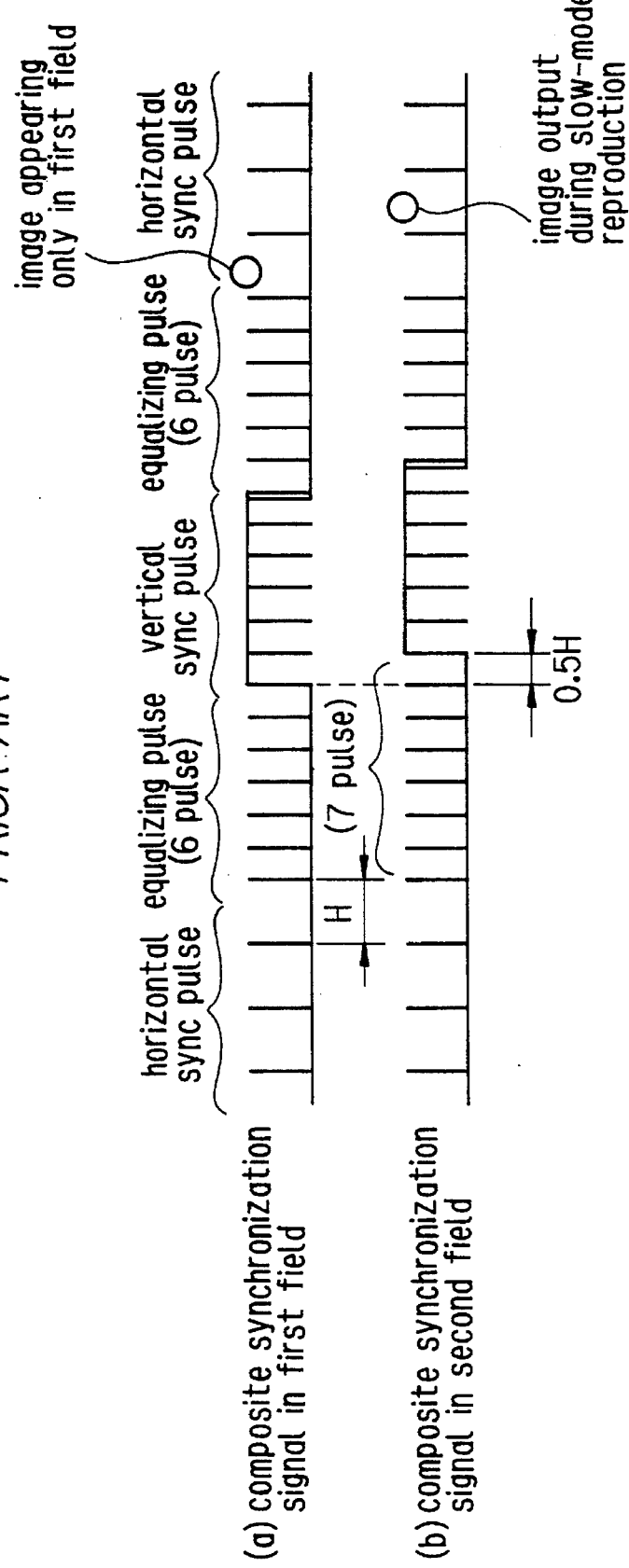
FIG. 2 shows waveforms of synchronization signals in a first field and a second field of the NTSC system.
Figure 3:
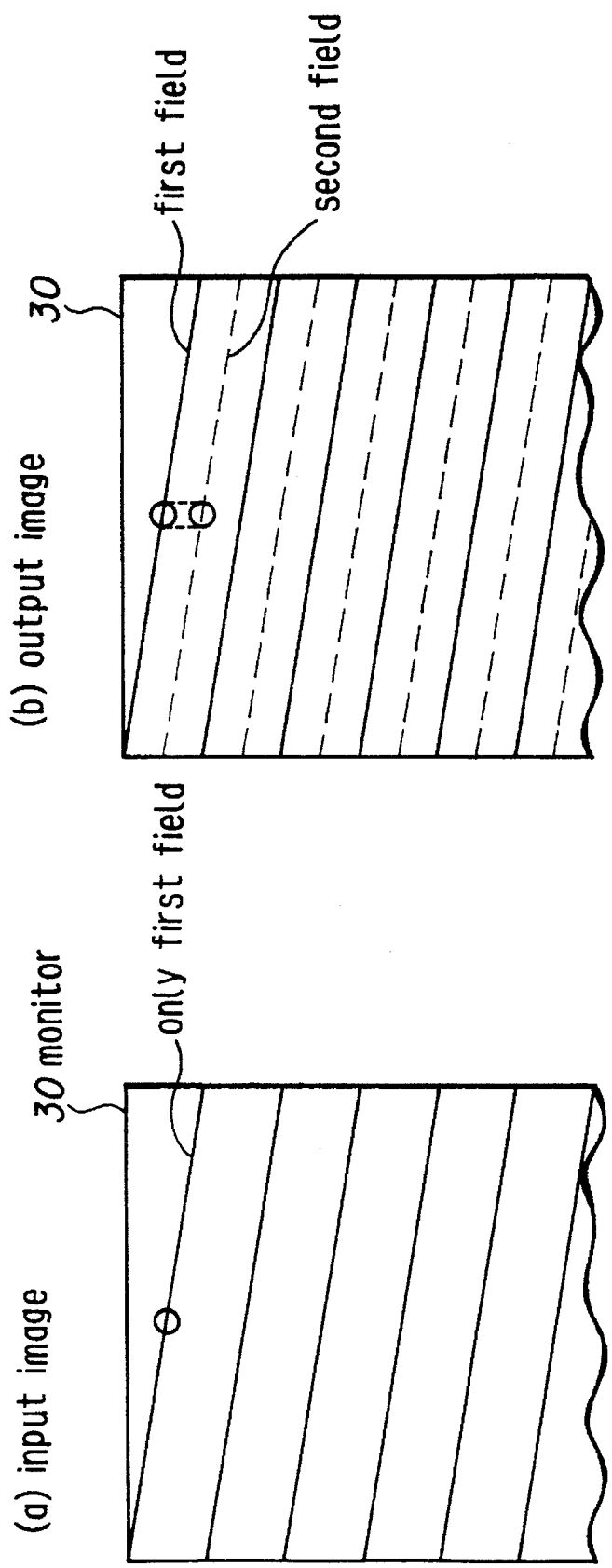
FIG. 3 is an explanatory diagram for explaining the relationship between an input image and an output image of a conventional time base correcting apparatus.

Referring to the drawings, a time base correcting apparatus according to a preferred embodiment of the present invention will now be described.

Figure 4:
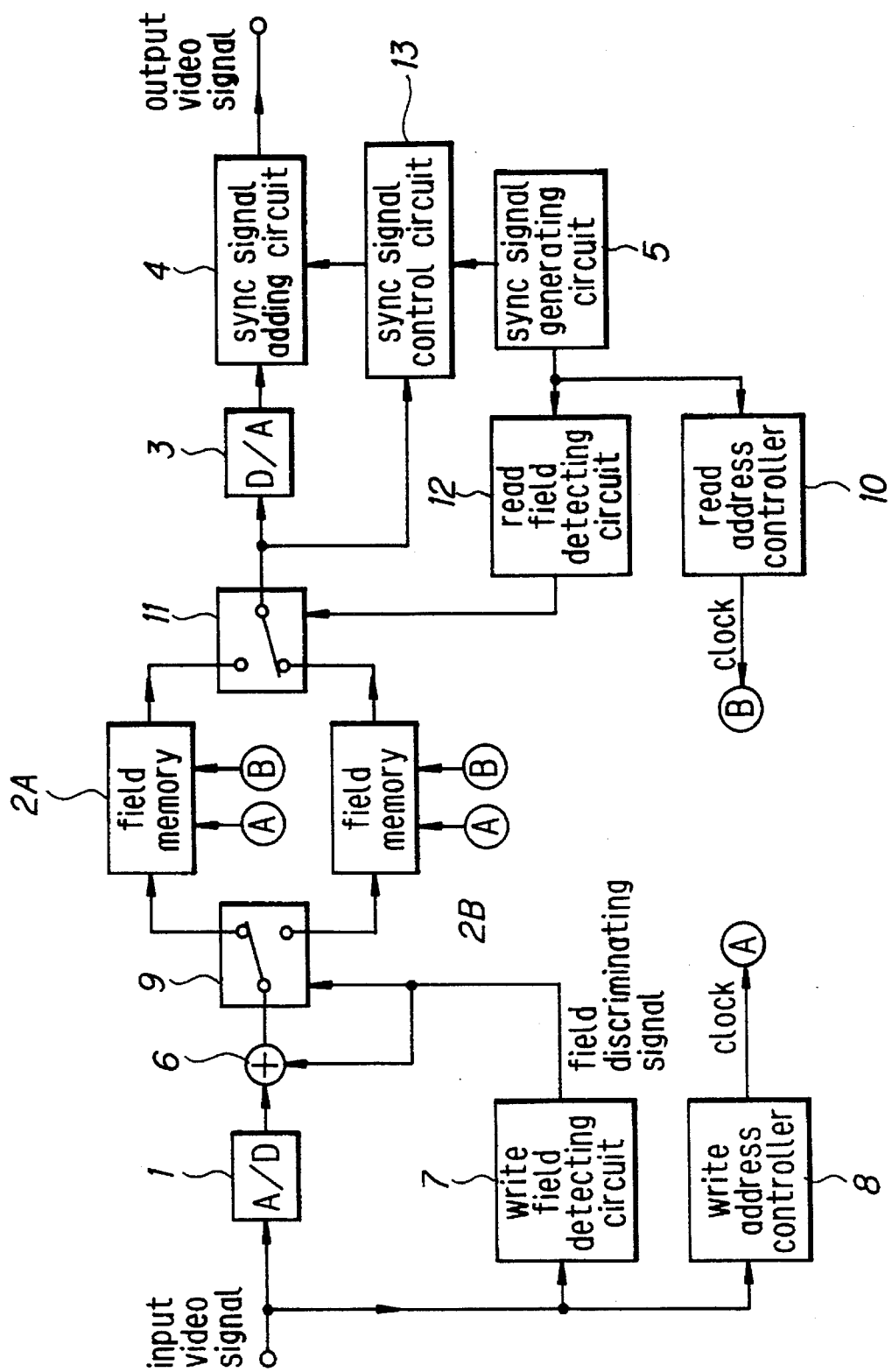
FIG. 4 is a schematic block diagram for showing a time base correcting apparatus according to a preferred embodiment of the present invention.

FIG. 4 is a schematic block diagram for showing a time base correcting apparatus according to one preferred embodiment of the present invention. In the time base correcting apparatus, for instance, a video signal reproduced from an inclined track of the magnetic tape by a rotary head is received as an input video signal, and the input video signal is A/D-converted by an A/D converter 1 into a digital video signal which will then be supplied to an adder circuit 6. Also, this input video signal is supplied to a write field detecting circuit 7 and a write address controller 8.

The write field detecting circuit 7 detects the number of equalizing pulses present before the vertical synchronization pulse to judge whether the input video signal corresponds to a first field or a second field, and thus outputs a field discriminating signal indicative of the sort of field for the input video signal. In the case of the first field, for instance, a "High" signal is output, whereas a "Low" signal is output in the case of the second field.

As a consequence, during reproducing modes such as the normal or high-speed reproduction modes, since the first field and the second field are alternately input at a predetermined time period, the "High" signal indicative of the first field and the "Low" signal representative of the second field are alternately output at a preselected time period from the write field detecting circuit 7. In the case of either slow-mode reproduction or still-mode reproduction, a video signal in either a first field or a second field is continuously input. The "High" signals are continuously derived from the write field detecting circuit 7 when the video signal of the first field is repeatedly reproduced. In the case of either the slow-mode reproduction or the still-mode reproduction, when the video signal of the second field is repeatedly reproduced, the "Low" signals are continuously derived from the write field detecting circuit 7. In this case, a signal for sectioning one field is also derived at the same time.

The above-described field discriminating signal is supplied to an adder circuit 6 by which this field discriminating signal is added to the digital video signal obtained from the A/D converter 1, and the resultant added signal is supplied to a changeover switch 9. This changeover switch 9 is switched every one field. When the field discriminating signal is high during the normal or high-speed reproductions, for instance, this switch 9 is switched to a field memory 2A side, whereas during the slow-mode reproduction this switch 9 is switched to a field memory 2B side.

Where field discriminating signals having high levels are consecutively supplied during either slow-mode reproduction or still-mode reproduction, the changeover switch 9 is alternately switched to the side of the field memory 2A and the side of the field memory 2B for every one field. Similarly, when field discriminating signals having low levels are continuously supplied, the changeover switch 9 is alternately switched to the side of the field memory 2A and the side of the field memory 2B every one field. As described above, the video signals output from the adder circuit 6 are alternately written via the changeover switch 9 into the field memories 2A and 2B every one field.

On the other hand, as previously described, the input video signal is supplied to a write address controller 8 in which a clock synchronized with the video signal is produced. Then, the clock is supplied to the field memories 2A and 2B. As a result, the writing operations of the video signals in the field memories 2A and 2B are performed in synchronism with the input video signals.

As will be described later, the video signals which have been written into the field memories 2A and 2B are read out at the timing of a newly generated synchronization signal (sync signal). In other words, in a synchronization (sync) signal generating circuit 5, the normal sync signals, namely the sync signal in the first field and the sync signal in the second field, are alternately and repeatedly produced at a predetermined time period, and the normal sync signals are supplied to an address controller 10 in which a clock is produced in synchronism with the sync signal. This clock is supplied to the field memories 2A and 2B respectively, so that the video signals are read out in response to this clock in synchronism with the new sync signal. Thus, jitter in the input video signals can be absorbed.

The read video signals are supplied via a changeover switch 11 to a D/A converter 3. The changeover switch 11 is switched at the timing of the sync signal generated by the sync signal generating circuit 5. That is to say, both the sync signal in the first field and the sync signal in the second field, which are generated by the sync signal generating circuit 5, are supplied to a read field detecting circuit 12 from which a "High" signal is output in the case of the first field and a "Low" signal is output in the case of the second field.

Then, the changeover switch 11 is switched to the field memory 2A side when a "High" signal is supplied to this changeover switch 11. The changeover switch 11 is switched to the field memory 2B side when a "Low" signal is supplied to this switch 11. In other words, the changeover switch 11 is switched every one field. As a consequence, the video signal of the first field is read out in synchronism with the sync signal in the first field which is newly produced, and the video signal of the second field is read out in synchronism with the sync signal in the second field during the normal or high-speed reproduction.

During either slow-mode reproduction or still-mode reproduction, since the video signal in the same field has been stored in the field memories 2A and 2B, the video signal in the same field is read out in synchronism with the sync signal of the first field and the sync signal of the second field, which have been newly generated. The read video signals are D/A-converted by the D/A converter 3, and thereafter the D/A-converted video signals are supplied to a sync signal adding circuit 4.

Meanwhile, the sync signal of the first field and the sync signal of the second field, which have been generated in the sync signal generating circuit 5, are supplied to a sync signal control circuit 13. In this sync signal control circuit 13, as will be explained later, these sync signals of the first and second fields are converted into sync signals corresponding to the fields of the input video signal, and the converted sync signals are supplied to the sync signal adding circuit 4.

Figure 5:
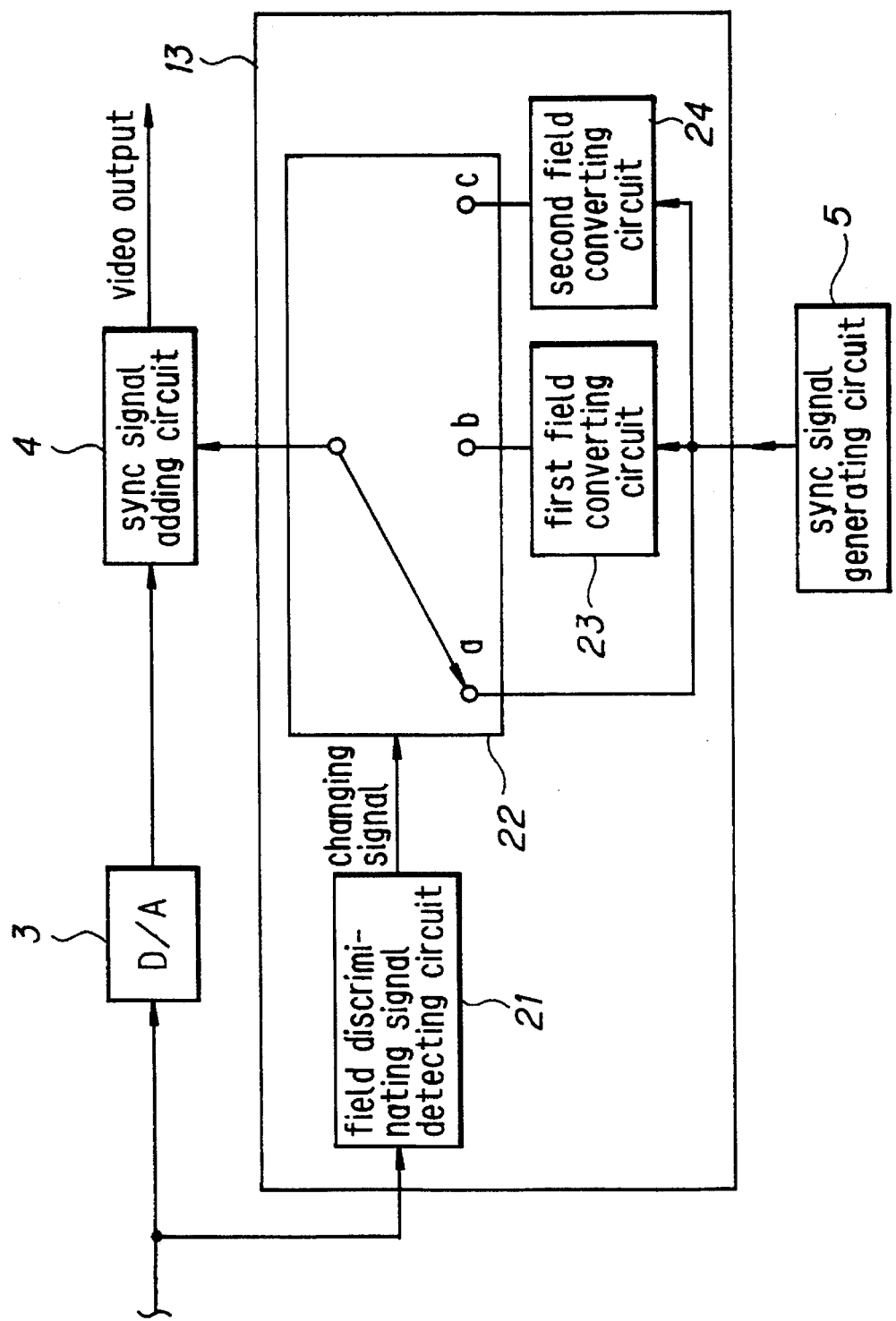
FIG. 5 is a schematic block diagram for representing a synchronization signal controlling circuit of the time base correcting apparatus according to the present invention.

FIG. 5 represents a block diagram of the sync signal control circuit 13. The video signal output from the changeover switch 11 is supplied to a field discriminating signal detecting circuit 21 employed in the sync signal control circuit: 13, by which the field discriminating signal contained in the video signal is detected. Then, a switching signal which discriminates between normal or high-speed reproduction, a video signal of the first field for slow-mode reproduction or still-mode reproduction, and a video signal of the second field for slow-mode reproduction or still-mode reproduction. These switching signals are furnished to a switch 22.

When the switching signal indicates the normal or high-speed reproduction mode, a changeover switch 22 is switched to a terminal "a" of the normal or high-speed reproduction mode. When the switching signal represents the first field of either slow-mode reproduction or still-mode reproduction, the changeover switch 22 is switched to a terminal "b" of the first field. Furthermore, when the switching signal indicates the second field of either slow-mode reproduction or still-mode reproduction, the changeover switch 22 is switched to a terminal "c" of the second field.

The terminal "a" of the normal or high-speed reproduction mode is directly connected to the sync signal generating circuit 5, so that the sync signal generated in the sync signal generating circuit is directly output. That is, the sync signal of the first field and the sync signal of the second field are alternately derived from this terminal "a" in predetermined time periods.

The terminal "b" of the first field is connected via a first field converting circuit 23 to the sync signal generating circuit 5. As will be explained later, in the first field converting circuit 23, the sync signal of the first field is directly output, the sync signal of the second field is converted into a sync signal equivalent to that of the first field, and then the converted sync signal is output.

Figure 6:
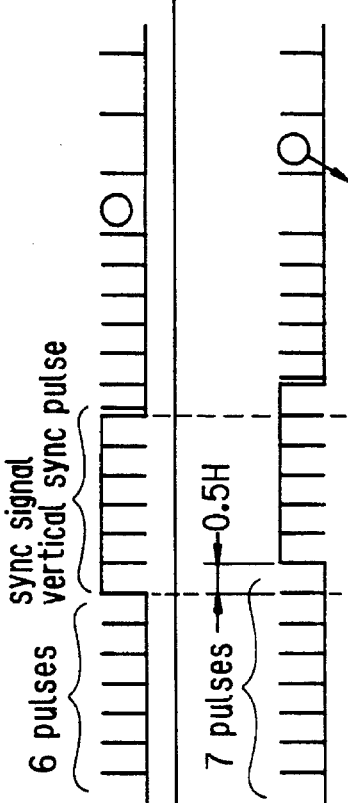
FIG. 6 schematically indicates a process operation of a first field converting circuit for converting an NTSC system video signal into a synchronization signal of the first field.

FIG. 6 represents the content of the processing operation performed in the first field converting circuit 23. It should be noted that a description will now be made of a case in which an input video signal corresponds to a television signal of the NTSC system. As shown in FIG. 6, the sync signal of the first field is directly output from this first field converting circuit 23.

As represented in FIG. 6(1), as to the sync signal of the second field, the vertical sync pulse is delayed by 0.5 H (symbol "H" indicates the horizontal scanning period) with respect to the first field. If the sync signal of the second field were to be directly added to the video signal, the image of the second field would be delayed by 1 H with regard to the image (indicated by a circle) of the first field. Therefore, as indicated by FIG. 6(2), the entire sync signal of the second field is shifted by 1 H in a backward direction. As a result, the image of the second field is located at the same position as the image of the first field.

However, under such circumstance, since the vertical sync pulse in the second field is shifted by 0.5 H with respect to the first field along the backward direction, the image in the first field would be overlapped by the image in the second field in a slightly shifted state. Accordingly, it may appear that the image is vibrating. To avoid this difficulty, as shown in FIG. 6(3), the vertical sync pulse is omitted, and subsequently a quasi-vertical sync pulse is inserted into the same position as the vertical sync pulse of the first field.

As a consequence, since the number of equalizing pulses in the second field present before the vertical sync pulse becomes 8, i.e., an even number, a judgement is made of the first field in the monitor 30, and then the same scanning line of the first field is traced. Thus, the image of the first field can be completely overlapped by the image of the second field.

Figure 7:
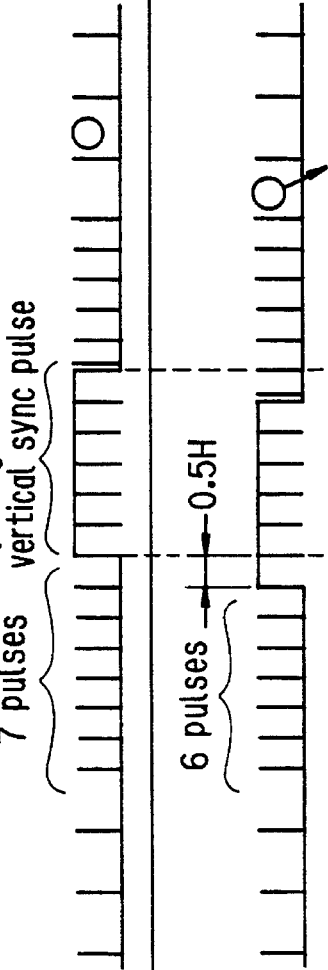
FIG. 7 schematically represents a process operation of a second field converting circuit for converting an NTSC system video signal into a synchronization signal of the second field.

In FIG. 5, the terminal "C" of the second field of the changeover switch 22 is connected via a second field converting circuit 24 to the sync signal generating circuit 5. In the second field converting circuit 24, as shown in FIG. 7, the sync signal of the second field is directly output, and the sync signal of the first field is converted into a sync signal equivalent to that of the second field, and then the converted sync signal is output. A description will now be made of the conversion operation for the sync signal in the second field in the NTSC system.

In FIG. 7, the sync signal of the first field indicated by FIG. 7(1) is first shifted by 1 H, as shown in FIG. 7(2), along the forward direction. This is because when the sync signal of the first field is added to the image of the second field, the image of the second field is 1 H earlier with respect to the image of the first field, contrary to the situation of FIG. 6. As a result, the image of the first field can be located at the same image position as that of the second field.

Under this condition, since the vertical synchronizing pulse of the first field is shifted by 0.5 H with respect to the second field, it may appear that the image is vibrating. To avoid such a difficulty, as indicated in FIG. 7(3), the vertical synchronizing pulses are omitted. Then, as shown in FIG. 7(4), a quasi-vertical sync pulse is inserted into the same position as the vertical synchronizing pulse of the second field.

Accordingly, since the number of equalizing pulses prior to the vertical synchronizing pulse becomes 5, namely an odd number, a judgement is made of the second field by the monitor 30, and the same scanning line of the second field is traced. Thus, the image of the first field can be completely overlapped by the image of the second field.

Figure 8:
FIG. 8 schematically shows a process operation of a first field converting circuit for converting a PAL system video signal into a synchronization signal of the first field.
Figure 9:
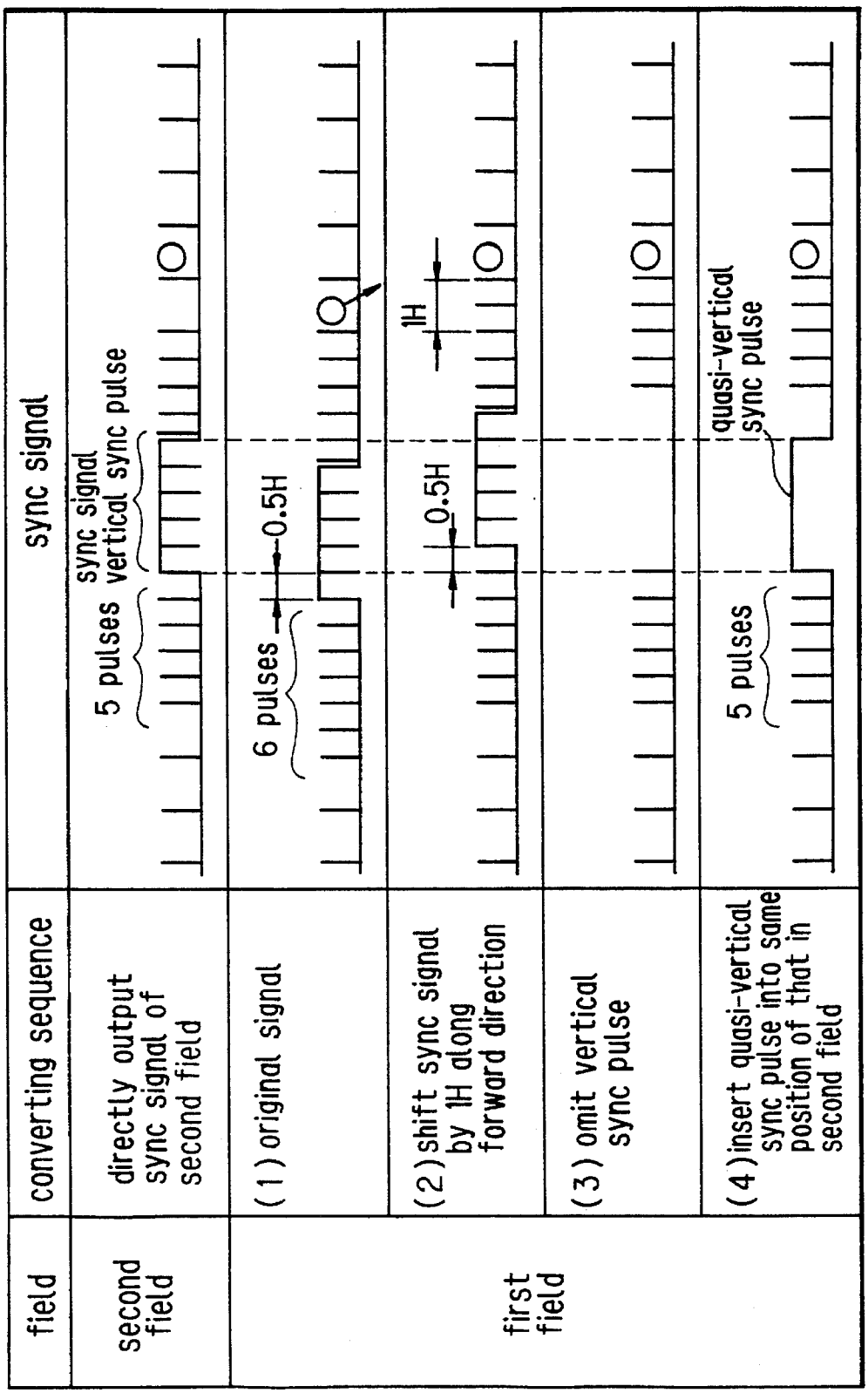
FIG. 9 schematically denotes a process operation of a second field converting circuit for converting a PAL system video signal into a synchronization signal of the second field.

FIG. 8 represents a conversion process of the first field converting circuit 23 in the PAL system, whereas FIG. 9 indicates a conversion process of the second field converting circuit 24 in the PAL system. It should be understood that since the number of equalizing pulses and vertical synchronizing pulses contained in the sync signal of the PAL system is merely different from that of the NTSC system, and furthermore the conversion sequence of the PAL system is similar to that of the NTSC system, a description thereof is omitted in this specification.

As a consequence, as previously described, any one of a sync signal produced during the normal or high-speed reproduction modes, a sync signal of the first field produced during either slow-mode reproduction or still-mode reproduction, and a sync signal of the second field produced during either slow-mode reproduction or still-mode reproduction, is output from the changeover switch 22. The output sync signal is added to the video signal in the sync signal adding circuit 4, and the resultant video signal is supplied to an external signal processing circuit (not shown).

As previously explained in detail, in accordance with the present invention, for instance, when a video signal of a first field is repeatedly and continuously input during either slow-mode reproduction or still-mode reproduction, the sync signal of the first field can be added to all of the video signals by converting a sync signal of a second field into an equivalent sync signal to that of the first field. Also, for example, when a video signal of a second field is repeatedly and consecutively input during either slow-mode reproduction or still-mode reproduction, the sync signal of the second field can be added to all of the video signals by converting the sync signal of the first field into an equivalent sync signal to that of the second field. Then, when the video signal of the second field is repeatedly and continuously input, the synchronizing signal of the second field can be added to all of the video signals. Furthermore, when the video signal of the first field is repeatedly and continuously input, the sync signal of the first field can be added to all of the video signals.

As a consequence, if the present invention were to be applied to, for instance, a VTR and the like, when a video signal of either a first field or a second field is repeatedly and continuously reproduced during slow-mode reproduction or still-mode reproduction, and this video signal is supplied to the monitor, the video signal of the first field is necessarily traced along the scanning line of the first field, and also the video signal of the second field is necessarily traced along the scanning line of the second field. Accordingly, there is the advantage that images can be correctly reproduced.

What is claimed is:

1. A time base correcting apparatus for removing time base errors from video signals in a video tape playback device operable in either a first operation mode or a second operation mode, said first operation mode being a normal or high speed reproducing mode which alternately reproduces first and second fields of video signals in succession from successive tracks on said tape, and said second operation mode being a still motion or slow speed reproducing mode which reproduces the same field from the same track at least twice in succession, said apparatus comprising:

receiving means for receiving the reproduced video signals having synchronizing information, said synchronizing information including equalizing, vertical sync and horizontal sync pulses;

detecting means for detecting field information for each of said reproduced video signals based on said synchronizing information;

memory means for storing each reproduced field of video data and for storing field information indicating whether the reproduced field is said first field or said second field;

write clock pulse generating means for generating write clock pulses for writing said video data into said memory means;

synchronizing signal generating means for alternately generating first synchronizing signals corresponding to said first field and second synchronizing signals corresponding to said second field, each of said first and second synchronizing signals including equalizing, vertical sync and horizontal sync pulses with the first synchronizing signal exhibiting a phase shift relative to said second synchronizing signal;

read clock pulse generating means for generating read clock pulses for reading said video data from said memory means to remove time base errors from said video data and thereby produce corrected video data;

correction means supplied with said field information and with the alternating first and second synchronizing signals and operable during said second operation mode to selectively generate corrected first and second synchronizing signals by shifting said first synchronizing signal in a backwards direction by one horizontal sync pulse when said field information indicates that the reproduced field is said first field and in a forwards direction by one horizontal sync pulse when said field information indicates that the reproduced field is said second field, and by replacing the vertical sync pulse of the synchronizing signal with a quasi-vertical sync pulse, so that said synchronizing signal and said corrected synchronizing signal added to the corrected video data reproduced twice in succession both have an even or an odd number of equalizing pulses; and adding means operable during said first operation mode for adding to said first and second fields of corrected video data the first and second synchronizing signals, respectively, and operable during said second operation mode for adding to the field of corrected video data reproduced twice in succession said first synchronizing signal and said corrected second synchronizing signal when said field information indicates that the reproduced field is said first field, and for adding to the field of corrected video data reproduced twice in succession said second synchronizing signal and said corrected first synchronizing signal when said field information indicates that the reproduced field is said second field, thereby producing output video signals.

2. The time base correcting apparatus according to claim 1, wherein said correction means includes:

detecting means for detecting said field information included in the corrected video data and for generating a field detecting signal representing one of said first and second fields;

first converting means for selectively converting said second synchronizing signal into a corrected second synchronizing signal equivalent to said first synchronizing signal;

second converting means for selectively converting said first synchronizing signal into a corrected first synchronizing signal equivalent to said second synchronizing signal; and switching means for supplying said first and second synchronizing signals to said adding means during said first operation mode, and for supplying said first and second synchronizing signals to a respective one of said second and first converting means during said second operation mode.

3. A time base correcting apparatus for removing time base errors from video signals in a video tape playback device operable in either a first operation mode or a second operation mode, said first operation mode being a normal or high speed reproducing mode which alternately reproduces first and second fields of video signals in succession from successive tracks on said tape, and said second operation mode being a still motion or slow speed reproducing mode which reproduces the same field from the same track at least twice in succession, said apparatus comprising:

receiving means for receiving reproduced analog video signals having video information and synchronizing information, the synchronizing information including horizontal sync pulses, vertical sync pulses and a quantity of equalizing pulses positioned before the vertical sync pulses;

first detecting means, coupled to said receiving means, for detecting the quantity of said equalizing pulses positioned before said vertical sync pulses of said analog video signals to discriminate said first field from said second field, and for producing a field discriminating signal representing the discriminated field.;

A/D converting means for converting the video information of said analog video signals to corresponding digital video signals;

first adding means for adding said field discriminating signal to each field of digital video signals;

memory means having first and second memory stores for storing each field of digital video signals including the field discriminating signal added thereto;

first selecting means supplied with said field discriminating signal for alternatively supplying a respective field of digital video signals to said first or second memory stores in response to said field discriminating signal;

write clock pulse generating means, coupled to said receiving means, for generating write clock pulses for writing the digital video signals into said memory means;

synchronizing signal generating means for alternately generating first synchronizing signals corresponding to said first field and second synchronizing signals corresponding to said second field, each of said first and second synchronizing signals including equalizing, vertical sync and horizontal sync pulses with the first synchronizing signal exhibiting a phase shift relative to said second synchronizing signal;

read clock pulse generating means for generating read clock pulses for reading said digital video signals from said memory means to remove time base errors therefrom and thereby produce corrected digital video information signals;

D/A converting means for converting said corrected digital video signals derived from said first and second memories to corresponding corrected analog video information signals;

second selecting means for alternately supplying said corrected digital video signals read out from said first and second memories to said D/A converting circuit;

correction means supplied with said field discriminating signal and with the alternating first and second synchronizing signals and operable during said second operation mode to selectively generate corrected first and second synchronizing signals as a function of the field indicated by said field discriminating signal by shifting said first synchronizing signal in a backward direction by one horizontal sync pulse when said field discriminating signal indicates that the reproduced field is said first field and in a forward direction by one horizontal sync pulse when said field discriminating signal indicates that the reproduced field is said second field, and by replacing the vertical sync pulse of the synchronizing signal with a quasi-vertical sync pulse, so that said synchronizing signal and said corrected synchronizing signal both have an even or an odd number of equalizing pulses, said correction means including, first converting means for selectively converting said second synchronizing signal into a corrected second synchronizing signal equivalent to said first synchronizing signal, second converting means for selectively converting said first synchronizing signal into a corrected first synchronizing signal equivalent to said second synchronizing signal, and switching means for supplying said first and second synchronizing signals to said adding means during said first operation mode, and for supplying said first and second synchronizing signals to a respective one of said second and first converting means during said second operation mode; and second adding means operable during said first operation mode for adding to said first and second fields of corrected digital video signals the first and second synchronizing signals, respectively, and operable during said second operation mode for adding to the field of corrected digital video signals reproduced twice in succession said first synchronizing signal and said corrected second synchronizing signal when said field discriminating signal indicates that the reproduced field is said first field, and for adding to the field of corrected digital video signals reproduced twice in succession said second synchronizing signal and said corrected first synchronizing signal when said field discriminating signal indicates that the reproduced field is said second field.

* * * * *